Feb. 8, 1966 W. G. BURHANS ET AL 3,233,738
FILTER
Filed Aug. 31, 1961 2 Sheets-Sheet 1

INVENTORS
WILLIAM G. BURHANS &
WENDELL H. GRAY
BY
ATTORNEYS

INVENTORS
WILLIAM G. BURHANS
& WENDELL H. GRAY
BY
ATTORNEYS

United States Patent Office 3,233,738
Patented Feb. 8, 1966

3,233,738
FILTER
William G. Burhans, Kingston, and Wendell H. Gray, Barclay Heights, Saugerties, N.Y., assignors to W.G.B. Oil Clarifier, Inc., Kingston, N.Y., a corporation of New York
Filed Aug. 31, 1961, Ser. No. 135,247
4 Claims. (Cl. 210—458)

This invention relates to oil filters of the full-flow, partial-flow type and is a continuation-in-part of our copending application Serial No. 22,844, filed April 18, 1960, and now abandoned.

In said application there is disclosed a full-flow, partial-flow filter of the type in which a major part of the lubricating oil courses through the main filter element and a minor portion, say 5%, of the oil is by-passed through a more dense fiber filtering element. Injurious solids are intended to be removed mainly by the full-flow filter element and impalpable solids are removed in the partial-flow element. Initially, however, finely divided impurities are filtered out by the partial-flow element until solid matter builds up on the full-flow element, thereby increasing its filtering effectiveness. Eventually, the full-flow element takes over the duty of filtering out solids injurious to the bearings and the sole duty of the partial-flow element becomes that of filtering out impalpable solids.

This application concerns details of the means of uniting filter cartridge elements. The simplicity of the means to unite the elements obviously is of considerable importance from the standpoint of manfacturing costs. Also important is the matter of effecting a uniting of the elements in such a manner that leakage of oil due to existing pressure differentials cannot occur.

Further objects and advantages will become apparent when the following description is read in conjunction with the accompanying drawings, in which.

Figure 1:
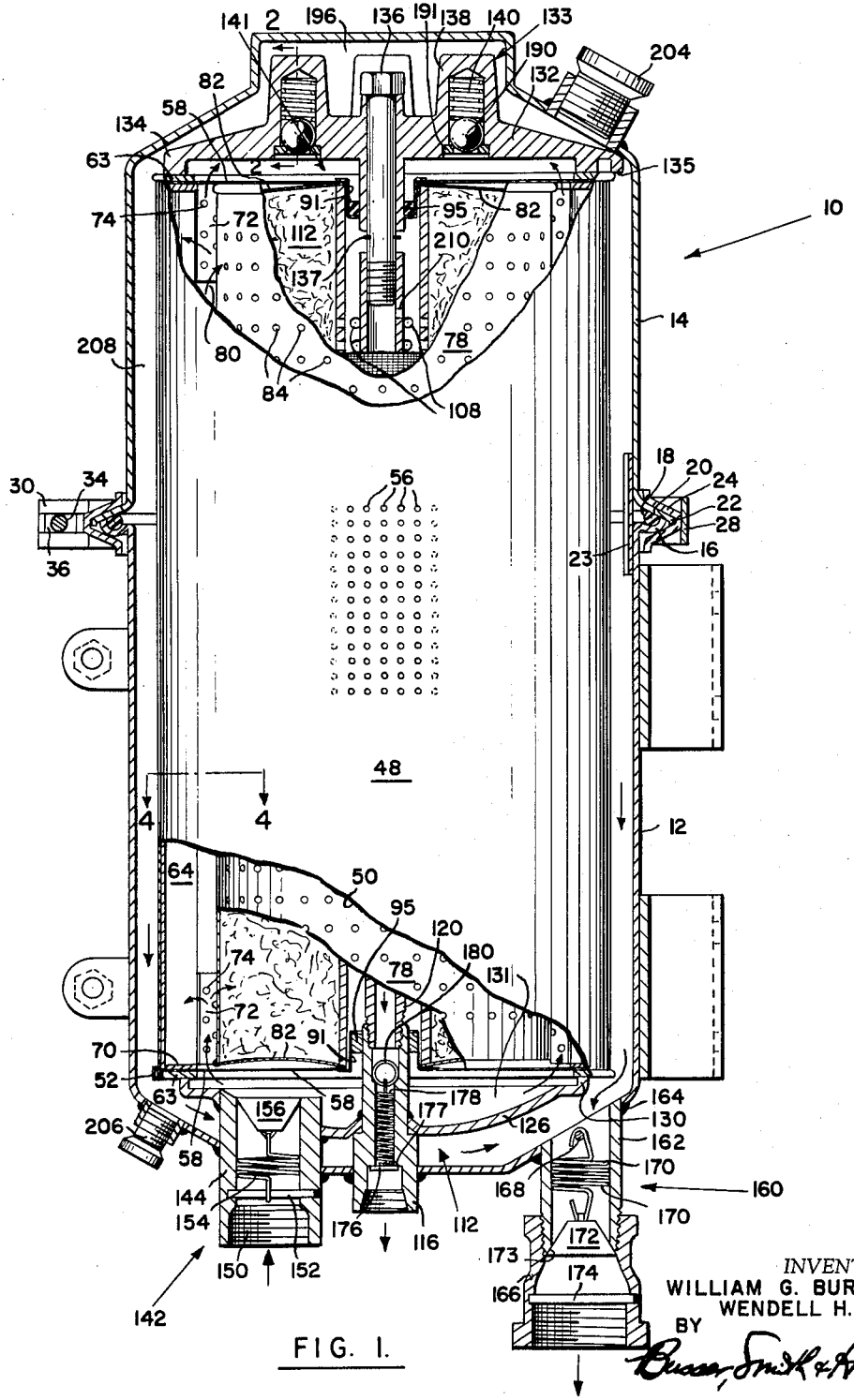
FIGURE 1 is an axial cross-section through a filter unit constructed in accordance with the invention, parts of the filter cartridge being broken away to clarify certain details of construction.
Figure 2:
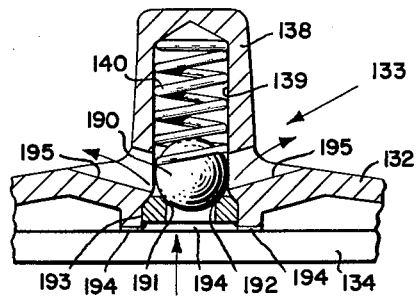
FIGURE 2 is an axial cross-section through a single pressure differential valve taken as indicated by lines 2—2 in FIGURE 1.

The filter unit constructed in accordance with the invention comprises a housing, generally designated 10, having a body section 12 and a cover section 14. Each of these sections is a deep drawn member made of sheet material such as steel or aluminum. At the upper terminal of the body section 12 is a radially outwardly extending flange 16 arcuately shaped in transverse section to form a seat for an O-ring 18. At the lower terminal of the cover section 14 is a radially outwardly extending axially sloping flange 20 terminating in a portion 22. The flange 20 overlies the O-ring 18 and the flange 16, the portion 22 of the flange 20 extending about the flange 16. Affixed to the cylindrical wall portion of the cover 14 are three guides 23 equally spaced circumferentially and extending axially into the body section 12.

For detachably securing the cover and body sections together four arcuately shaped clamp shoes 24 (only one of which is shown) are fitted over the flanges 16 and 20. These shoes are V-shaped in transverse section and are adapted for camming together the flanges 16 and 20. Embracing the several shoes 24 is a band 28, one end portion of which is folded back upon itself to form a loop 30. This loop embraces the head 32 of a T-shaped bolt, the stem 34 of which extends freely through an aperture 36 formed in the band 28 and has a knob (not shown) threaded on the free end thereof. Affixed to the opposite end of the band 28 is a bifurcated fitting having a socket formed therein, the knob being provided with a rounded end portion seated in this socket 42. Brackets for mounting the unit are indicated at 46. The above details are more fully illustrated in said copending parent application.

Within housing 10 is a filter cartridge unit, generally designated 48. This unit comprises a cylindrical outer can body 50 made of lightweight sheet metal. The body 50 is provided with a longitudinally extending lapped seam (not shown) spot-welded on approximately one-inch centers and soldered along its full length. Each terminal portion of the body 50 is turned outwardly and rolled back, as at 52, to form a circumferentially extending recess. The body 50 is provided over its entire surface with perforations 56, the aggregate area of these perforations being well in excess of that of the oil inlet. At each end of the body 50 is a cover 58 set back from the end of the body 50. The periphery of the cover 58 is rolled about together with the end of the body 50 and tucked into said recess to form a tight seam. Adhesively secured to the cover 58 is a flat neoprene ring seal or gasket 63.

Figure 4:
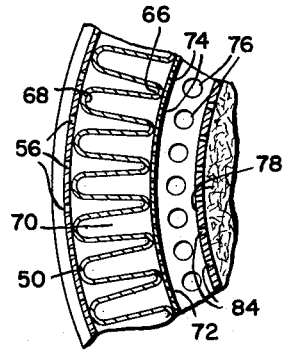
FIGURE 4 is an enlarged fragmentary section on the plane indicated by line 4—4 in FIGURE 1.
Figure 3:
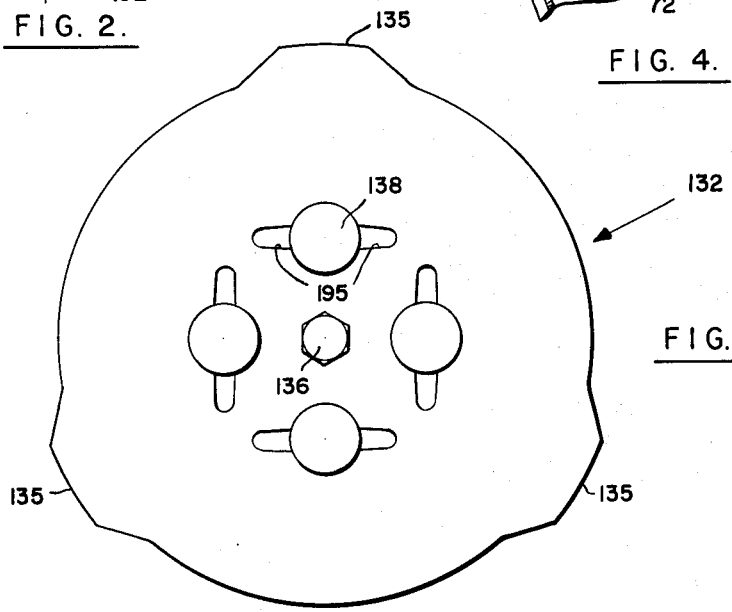
FIGURE 3 is a plan view of the complete pressure differential valve assembly.

Within the body 50 is a vertically cylindrical full-flow filter element 64 made of paper impregnated with a suitable substance. Referring particularly to FIGURE 4, it will be observed that the inner folds 66 of the filter element are rather sharp, while the outer folds 68 are formed to a comparatively large radius. Each end of the filter element is adhesively secured to a flat paper ring 70. At each end of the cartridge is a cylindrical band 72 fitted snugly within the filter element 64, the band being perforated as indicated at 74. Circumferentially spaced equally about each cover plate 58 are series of openings 76 located just inside the filter element 64.

Within the body 50 is a cylindrical inner can body 78 made of light weight sheet metal and a diameter appreciably smaller than the internal diameter of the filter element 64. The space between the body 78 and the filter element 64 communicates with the openings 76 in the covers 58 and forms a path, designated 80, for the entering oil. Each end of the body 78 is provided with a cover 82 secured to the body 78 in the same manner that the covers 58 are joined to the body 50. The body 78 is provided over its entire surface with perforations 84. The covers 82 are provided with central openings registering respectively with central openings in the covers 58. Driven into these openings at each end of the cartridge unit is the cylindrical body of a cup-shaped insert 91, and the inserts 91 have fitted thereover the opposite end portions of a kraft paper tube 106 which is glued at its end to the respective covers 82. Tube 106 is provided throughout the major portion of its length with numerous openings 108, and the section of the tube provided with these openings is covered with screening which may comprise a tubular knitted cloth fabric. The space surrounding the tube 106, within the cylindrical body 78, is filled with an open fibrous material 112 which may be a mixture of paper and wood for example.

Novel aspects of invention are involved in the above briefly described means of uniting the filter elements. The matter will be more specifically discussed with reference to FIGURE 5. It was mentioned briefly in the introduction hereto that simplicity of construction is an important objective, and this is particularly true in the present case wherein the filter cartridges are mass produced. In assembly of the filter cartridge the partial-flow elements are provided in completed condition, the covers 82 having been seamed to the can 78 containing filter material 112 and the screen-covered tube 106. There now arises the problem of how to incorporate this within the outer full-flow filter element which includes the can 50 seamed with covers 58 and containing filter paper 64. Adjacent their respective central openings 86 and 89 the covers 58 and 82 must be tightly united to form an effective seal, yet this operation must not necessitate expensive and complicated manufacturing techniques. In particular, it is desired to avoid the necessity of soldering, welding and the like in this operation. These problems are overcome by the structural details and method of assembly described hereafter.

Figure 5:
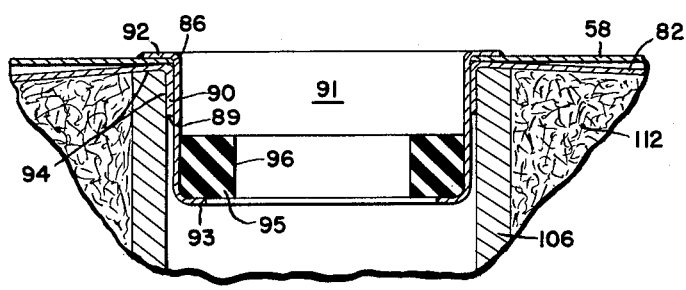
FIGURE 5 is an enlarged cross-section of the structural details involved in uniting of the filter elements.

In assembly, an inner partial-flow element (can 78) is provided and over one of its end covers 82 a cover 58 is positioned, the openings 86 and 89 being then in alignment. An insert 91 is supplied. The insert 91 has a flange 92 adapted to overlay the cover 58 adjacent its opening 86, and an inwardly directed portion 93 provides a ledge for support of a gasket 95. Gasket 95 has a central opening 96, for purposes discussed more fully hereafter, and is secured within insert by suitable cement. Insert 91 is now forced through openings 86 and 89, thereby bending the inner edge 90 of cover 82 inwardly as shown in FIGURE 5. The presence of paper tube 106 presents novel aspects in connection with this operation. It would be suspected that in order to drive insert 91 through covers 58 and 82, thereby to bend the edges 90 of the latter as shown, some form of inner support of the nature of a female die would have to be provided. The tube 106, however, fulfills this need, in that it provides support both vertically and transversely at areas indicated at 94. Thus a tight frictional gripping force is created between the wall of insert 91 and the portions of the covers defined by opening 86 and the inwardly turned edge 90. The covers 58 and 82 are tightly pressed between flange 92 and the abutting end of tube 106, this pressing action being maintained by such frictional gripping.

The outer can 50 is, of course, seamed as at 52 to the cover 58 which has been united with the inner filter element in the manner described above. Following these stages of assembly the paper filter 64 is inserted in the annular space between can bodies 50 and 78. The other cover 58 is then put in place. The remaining final stages in assembly of a complete filter cartridge unit then comprise the connection of the last cover 58 to can 50 and the uniting of this cover with its underlying cover 82 by means of an insert 91. The last-mentioned operation is simply a repetition of what has been described hereinabove with reference to FIGURE 5. It should be noted that both ends of the filter cartridge are of identical construction, involving particularly the insert 91 and covers 58 and 82.

Carried by the body 12 is means, generally designated 114, for mounting the filter cartridge unit 48. This means comprises a valve body 116 extending through the bottom wall of the body 12 and affixed thereto. Threaded into the upper end portion of the body 116 is the lower end portion of a tubular center post 120 having an orifice 210 at its uper end. The upper end portion of the valve body 116 extends through the opening 96 in the gasket 95. Fitted over the valve body 116 is a dished plate 126 affixed to the body 116. The plate 126 is provided with a raised rim 130 upon which is seated the associated gasket 63. It will be observed that between the plate 126 and the overlying cover 58, and extending about the body 116, is a chamber 131 communicating with the opening 76 formed in the cover 58.

The body 12 is provided with an inlet valve assembly, generally designated 142. The valve has a body 144 which extends through and is welded to the bottom of the body 12 and plate 126. The lower end portion of the valve body is threaded at 150 for connection to a supply line. A pin 152 has opposite end portions secured in the valve body and has anchored thereto one end portion of a tension spring 154, the maximum diameter of this tension spring being only slightly less than the internal diameter of the body 144. The opposite end of the spring 154 is attached to a valve 156 which is tapered, as shown, for engagement with a correspondingly tapered valve seat.

Body 12 is provided also with an outlet valve assembly, generally designated 160, having a body 162 extending through the bottom wall of the body 12 and affixed thereto by welding 164. Threaded onto the lower end portion of the body 162 is a coupling 166. A pin 168 has opposite end portions affixed to the body 162 and has anchored thereto one end portion of the tension spring 170, the outside diameter of which is only slightly less than that of the internal diameter of the body 162. The opposite end portion of the spring 170 is affixed to a valve element 172 which is tapered, as shown, for engagement with a correspondingly tapered valve seat 173. A pin 174 has opposite end portions affixed to the coupling 166.

Within the valve body 116 is a valve comprising a disc 176, seated upon a shoulder 177 and carried by a tension spring 178 held by a ring 180 seated upon a shoulder. The purpose of valves 156, 172, and 176 is to prevent draining of the filter when the engine is not running, as discussed hereafter in connection with operation of the filter.

At the upper end of the cartridge is a head 132 which provides a housing for a plurality of pressure differential valves indicated individually and generally at 133. Head 132 comprises preferably an aluminum alloy casting (for light weight), and has machined thereon a flat annular rim 134 which engages gasket 63. Three circumferentially spaced flanges 135 serve to centrally locate the head 132 relative to cartridge unit 48. Head 132 is pulled tightly against gasket 63 by means of a bolt 136 extending through the head centrally and threaded into the previously mentioned tube 120. A novel innovation comprises a ring 137 snapped into a groove in bolt 136, the purpose being to lift the entire head 132 off gasket 63 when the bolt is loosened. It may be noted that a downwardly extending nipple formed on the head casting extends through the opening 96 in gasket 95.

Each of the valves 133 embodies a unique construction which is considered to be a marked departure from and improvement over prior designs. For each valve a dome 138 is cast in the head 132 and a chamber therein is defined by a bore 139 drilled from the underside. A compression coil spring 140 and a metal ball 190 each having a diameter slightly less than bore 139 are received therein. Ball 190 is urged by the compressed spring 140 against a ring 191 providing a tapered valve seat 192. Ring 191 is retained in an enlarged bore 193, which consitutes the valve inlet port, by upsetting the head casting in the circumferentially spaced points designated 194. Outlet ports are defined by passages 195 which communicate with bore 139 and are provided by drilling transversely through the sides of dome 138, it being noted that in its normal valve-closing condition the ball 190 rests on the seat 192 in a position opposite these passages 195. The passages 195 lead to a chamber 196 at the top of cover section 14 and thereby communicate directly with the anti-draining outlet valve assembly 160.

Cover 14 is provided with an opening normally closed by a plug 204, and the body 12 is provided with an opening normally closed by a plug 206.

In the operation of the filter, oil from the crank case of an engine enters under pressure at 142, lifting the valve 156 from its seat 158 against the influence of spring 154. Oil passing valve 156 enters chamber 131, filling the same, and then passes through the several openings 76 into the space 80 between the full-flow filter element 64 and the body 78. The multiplicity of circumferentially spaced openings 76 effects uniform distribution of the oil. The oil rises in the space 80 and passes through the openings 76 in the cover 58 at the upper end of the cartridge to fill chamber 141. The major portion of oil in space 80 is thus forced through full-flow filter element 64 and then through the multiplicity of perforations 56 in body 50 to a cylindrical space 208 between body 50 and the cylindrical housing wall, where the pressure is comparatively low. Then it flows downwardly to the space between the plate 126 and the bottom wall of body 12. Passing around the valve bodies 116 and 144, the oil is discharged from the unit at 160. The oil, under this comparatively low pressure moves the valve 172 from its seat 173 against the influence of the spring 170. Oil which passes the valve 172 is conducted to the bearings of the engine, from which it flows to the crank case.

A minor portion of the oil, say less than 5%, passes from the space 80 through the multiplicity of openings 84 in the body 78 and then through the partial-flow filter element 112 toward tube 106. After passing through screening 110, the oil passes through the multiplicity of openings 108 in tube 106 and fills the cylindrical space extending about center post 120 and within the tube 106, where the pressure is comparatively low.

Oil enters the upper end of center post 120 via the orifice 210, across which there is a pressure drop, but pressure within center post 120 is sufficiently high so that oil passing downwardly therethrough unseats valve 176 against the influence of spring 178. Oil passing valve 176 is conducted directly to the crank case.

The oil pressure within the chambers 131 and 141 is high, i.e., the same as the oil pressure in the space 80. This high pressure acting upon the gaskets 95 presses each of them against the base of the associated insert 91, as a consequence of which the gaskets 95 are compressed and tend to increase in outside diameter and decrease in inside diameter. Thus the gaskets 95 seal tightly against the cylindrical walls of inserts 91 and against valve body 116 and the central nipple on head 132. The greater the oil pressure in the chambers 131 and 141 the more the gaskets 104 are compressed for tighter sealing.

As indicated hereinabove, the oil pressure within the chamber 141 is high compared to the oil pressure in chamber 196. The pressure differential valves 133 are employed to by-pass oil around the filter sections when the oil pressure within the chamber 141 is undesirably high when compared to the oil pressure above the chamber 141, i.e., as compared to the oil pressure in chamber 196. Each valve 133 is spring loaded for opening in response to a given different pressure differential, although the valves may be set to open at different differential pressures as disclosed in said copending application. In the latter application, the valves are described as opening one at a time sequentially as the pressure differential increases and reclose one at a time sequentially in the reverse order as the pressure differential drops. Typically, however, each of the relief valves may be set to be opened by a pressure differential greater than approximately 45 p.s.i. The pressure differential depends, of course, upon the engine upon which the filter unit is mounted.

The anti-chattering feature of the valves 133 is a significant one, for in practice it has been found that the chattering and hammering of a plurality of such valves simultaneously causes very annoying noise and possibly damage to the filter ports. In the operation of each valve 133, as the pressure differential between chambers 141 and 196 increases beyond a given level, ball 190 is lifted from seat 192. The flow of oil, however, is not controlled solely by the opening of a flow path between ball 190 and seat 192, but is controlled also by the relationship of ball 190 to side passages 195. As ball 190 rises, the obstruction to flow through passages 195 as through seat 192 is lessened, and vice versa as ball 190 moves downwardly. Sudden surges of flow through a valve can cause corresponding fluctuations in pressure differential which give rise to erratic valve behavior. According to the invention, however, a smoothing out of flow is effected by the stabilizing variable flow resistance provided by ball 190 and passages 195.

Due to the restricted orifice 210, as mentioned only 5% or less of the oil passes through the partial-flow filter 112. The rest of the oil passes through the full-flow filter 64.

When the full-flow filter becomes clogged by an accumulation of filtered residue, it becomes necessary, of course, to remove the cartridge and to replace it with a fresh cartridge. In order to make the change, the band 28 is loosened and cover 12 is lifted from body 14. Now the bolt 136 is unscrewed from center post 120, which effects the lifting of head 132, by means of ring 137, from off the gaskets 63. The exhausted cartridge may now be removed and replaced with a fresh one. In this connection, it will be noted that both the full-flow and partial-flow filter sections are incorporated in a single replaceable unit for easy handling. After the fresh unit is in place, the assembly is replaced by tightening of bolt 136.

After replacing the cover, plug 204 is removed, thus venting the unit. Oil is now poured into the unit through the vent opening to fill the unit. In this way a supply of oil is available for supply to the bearings as soon as the engine starts. When the engine stops, oil ceases to flow through the filter unit, but oil therein is trapped by valves 156, 172 and 176 and cannot drain therefrom back through the oil pump.

The size of the unit can be changed with a minimum expenditure of time and at very little cost. For example, to shorten the assembly, the cover, cartridge and center post are removed and replaced by a shorter center post, cartridge and cover. The same lower body, brackets and differential valve assembly may be used. Since the opposite end portions of the cartridge are identical, a plurality of such cartridges may be placed in end-to-end relation to conjointly form a cartridge assembly of desired length.

It will be understood, of course, that the present invention, as shown and described, is susceptible of various changes and modifications which may be made without departing from the principles of the invention. Accordingly, it is intended to claim the present invention broadly as well as specifically as indicated in the appended claims.

What is claimed is:

1. A filter cartridge comprising an outer cylindrical can body having a cover at each end, an inner cylindrical can body concentrically contained within said outer can body and having a cover at each end, the respective covers of said can bodies being in partially overlapping relationship at each end thereof and having aligned central openings, the openings of the inner covers each being defined by a flanged portion thereof extending inwardly, a perforated tube extending axially through said inner can body and having its ends encircling said flanged portions, said flanged portions being constructed to be spaced from said tube under normal unstressed condition thereof, a cylindrical insert forced through the opening in each outer cover and within the aligned flanged portion of the underlying inner cover to bend said flanged portions away from their normal position into contact with said tube whereby each said flanged portion frictionally holds its respective insert in its assembled position, each said insert having a radially directed flange at its outer end extending over its associated outer cover adjacent the said opening therein, whereby each said cover flange portion is securely held between said tube and the insert driven therethrough and the ends of the cartridge are securely united by said inserts, and filter material contained within said can bodies, the containers provided by said can bodies and covers having suitable openings therein for the distribution of liquid through the cartridge.

2. A filter cartridge according to claim 1, wherein said perforated tube is covered on its outside by a filtering material.

3. A unitary filter cartridge comprising an outer cylindrical can body having a cover at each end, an inner cylindrical can body concentrically contained within said outer can body and having a cover at each end, the respective covers of said can bodies being in partially overlapping relationship at each end thereof and having central portions defining axially aligned central openings, the openings in the inner covers each being defined by a flanged portion thereof extending axially inwardly, a perforated tube extending axially through said inner can body and having its ends encircling said flanged portions, said flanges being constructed to be spaced from said tube under the normal and unstressed condition thereof, a cylindrical insert forced within each flanged portion of the inner covers to bend said flanged portions away from their normal position into contact with said tube to secure together said tube, said inner covers and said inserts, each of said inserts having a portion in engaging contact with said central portion of each outer cover to secure together said inserts and said outer covers, and filter material contained within said can bodies, the containers provided by said can bodies and covers having suitable openings therein for the distribution of liquid through the cartridge.

4. A unitary filter cartridge comprising an outer cylindrical can body having a cover at each end, an inner cylindrical can body concentrically contained within said outer can body and having a cover at each end, the respective covers of said can bodies being in partially overlapping relationship at each end thereof and having central portions defining axially aligned central openings, a perforated tube extending axially through said inner can body, a cylindrical insert forced through the aligned openings in the central portions of said inner and outer covers at each end of the cartridge, each said insert being in frictional contact with the associated central portions of said covers for holding said covers in place with respect to one another and with respect to the inserts, said inserts extending within said tube at each end thereof in cooperative relation therewith to limit movement thereof relative to said covers and to position the tube centrally with respect to the covers, said inserts each having a radially directed flange at its outer end extending over and in contact with its associated outer cover adjacent the opening therein, whereby said inner and outer covers at the ends of the cartridge are securely united by said inserts, and filter material contained within said can bodies, the containers provided by said can bodies and covers having suitable openings therein for the distribution of liquid through the cartridge.

References Cited by the Examiner

UNITED STATES PATENTS

| 1,607,027 | 11/1926 | Wall | 210—133 |
|---|---|---|---|
| 2,107,704 | 2/1938 | Kronquest | 137—539 X |
| 2,256,516 | 9/1941 | Carlin | 137—539 |
| 2,533,266 | 12/1950 | Kovacs et al. | 210—440 X |
| 2,747,738 | 4/1956 | Johnson et al. | 210—130 |
| 2,747,744 | 5/1956 | Gretzinger | 210—442 |
| 2,855,103 | 10/1958 | Wilkinson | 210—315 |
| 2,966,269 | 12/1960 | Allen | 210—132 |
| 3,085,688 | 4/1963 | Eberle | 210—232 |

FOREIGN PATENTS

| 908,222 | 8/1945 | France. |
|---|---|---|
| 1,216,495 | 11/1959 | France. |

REUBEN FRIEDMAN, *Primary Examiner.*

HERBERT L. MARTIN, *Examiner.*